United States Patent [19]

Morales

[11] Patent Number: 5,036,389
[45] Date of Patent: Jul. 30, 1991

[54] SATELLITE CONTROLLED AUDIENCE POLLING SYSTEM

[75] Inventor: Fernando Morales, Monterrey, Mexico

[73] Assignees: Magus, Ltd., Grand Cayman Island; Cayman Corporate Services, Georgetown, both of Cayman Islands

[21] Appl. No.: 379,921

[22] Filed: Jul. 14, 1989

[51] Int. Cl.$^5$ ........................ H04N 7/10; H04B 17/00
[52] U.S. Cl. ........................................ 358/84; 455/2; 455/5
[58] Field of Search ........................ 455/2–3, 455/4–6; 358/84, 86; 340/825.08

[56] References Cited

U.S. PATENT DOCUMENTS

| | | | |
|---|---|---|---|
| 4,107,735 | 8/1978 | Frohbach | 340/721 |
| 4,151,370 | 4/1979 | Foot | 455/2 |
| 4,377,870 | 3/1983 | Anderson et al. | 455/2 |
| 4,591,906 | 5/1986 | Morales-Garza et al. | 358/84 |
| 4,630,108 | 12/1986 | Gomersall | 358/84 |
| 4,684,980 | 8/1987 | Rast et al. | 358/86 |
| 4,689,619 | 8/1987 | O'Brien, Jr. | 358/84 |

Primary Examiner—Reinhard J. Eisenzopf
Assistant Examiner—Andrew Faile
Attorney, Agent, or Firm—Laurence R. Brown

[57] ABSTRACT

A satellite controlled TV audience response system provides means for current processing of answers to audience polls so that answers may be presented in TV pictures alongside the questions substantially instantaneously. This system has the capacity to process both local audience responses such as those in the vicinity of a particular TV station, and audiences over a large geographic area, so that responses can be analyzed to take into account regional differences in response or differences in the listeners to different TV station audiences. The system is fully capable of interaction with local cable networks. Responses can be analyzed at local ground stations for billing purposes, etc., and can be analyzed at the satellite station for retransmission of various audience responses to the polled audience. This invention makes feasible a fully automated instantaneous nationwide TV polling and response feedback system.

14 Claims, 6 Drawing Sheets

SATELLITE CONTROLLED AUDIENCE POLLING SYSTEM

FIELD OF THE INVENTION

This invention relates to audience polling systems, and more particularly it relates to TV audience polling employing satellite stations for processing of audience response data for display of audience polling questions on TV pictures together with poll results.

BACKGROUND ART

Various sorts of voting, polling and two-way TV systems are known in the art. Such systems are described for example in U.S. Pat. No. 4,536,791; Aug. 20, 1985 to John G. Campbell, et al. for Addressable Cable Television Control System with Video Format Data Transmission.

Satellite communication systems for TV are also well known in the art, as exemplified by U.S. Pat. No. 4,684,980; Aug. 4 1987 to Robert M. Rast et al. for System for Controlling Communications on a Cable Television Network, wherein a ground based audience polling system is disclosed and the satellite station is used for transmission only of TV programming.

Former audience polling TV systems, whether cable, broadcast or hybrid in nature, have been limited in performance generally to billing and accounting and purchasing functions or central processing of audience response data for use in listenership analysis and the like by network listener ranking agencies, for example.

It is however an object of this invention to provide TV audience polling systems capable of current or on-line review of polling results by the audience being polled.

DISCLOSURE OF THE INVENTION

This invention provides an on-line TV system in which questions are presented on a receiver screen as part of a transmitted TV picture, and are answered by a response unit at the various receiver sites within a polled audience range. The audience signals responding to the questions on the TV picture are transmitted on-line in real time by means of r-f beeps of a known frequency in a narrow transmission band to an audience response processing station in the manner set forth in U.S. Pat. No. 4,591,906; May 27, 1986 to Fernando Morales-Garza et al., which patent disclosure is incorporated herein in its entirety to simplify the present disclosure and prevent obscurity of the nature of the invention by incorporation of circuit and system details found therein. This system in particular illustrates how to use simple r-f beeps to identify specifically each of a large number of TV receiver stations within the range of a local TV transmitting station, for example. This permits billing and identification of the responders for demographic analysis, etc. This system synchronously times the response beeps from the transmitted picture video so that they are accurately enough positioned with the transmitted picture information for response to a muliplicity of questions, and for permitting individual receiver station identification at different geographical positions within a reception area taking into account the radio wave travel time from the TV transmitter to the particular receiver station and back to the audience beep response analysis station, conveniently located for example at the TV transmitter site.

In this invention, a plurality of local TV station audiences may be polled and the polling results processed on-line for current retransmission of the audience reaction back to the received TV picture screen for display alongside the questions. This is done via satellite station processing of the audience response for incorporating answers processed as desired for deriving desired audience information to appear alongside the questions when retransmitted from the satellite station back to the polled audience. For example, different local audiences may be polled for communication to the satellite station from local audience processing stations on different frequency bands so that the satellite station can process and program different kinds of audience analysis, such as the response in metropolitan New York City, Los Angeles or Denver, or the cumulative nationwide audience response to a comedian's joke or a political preference. In this manner on-line automatic polling is made possible by this invention affording instantaneous feedback of polling results.

BRIEF DESCRIPTION OF THE DRAWINGS

Further objects, features, advantages and embodiments of the invention will be found throughout the following description and in the accompanying drawings, wherein.

THE PREFERRED EMBODIMENTS

Figure 1:
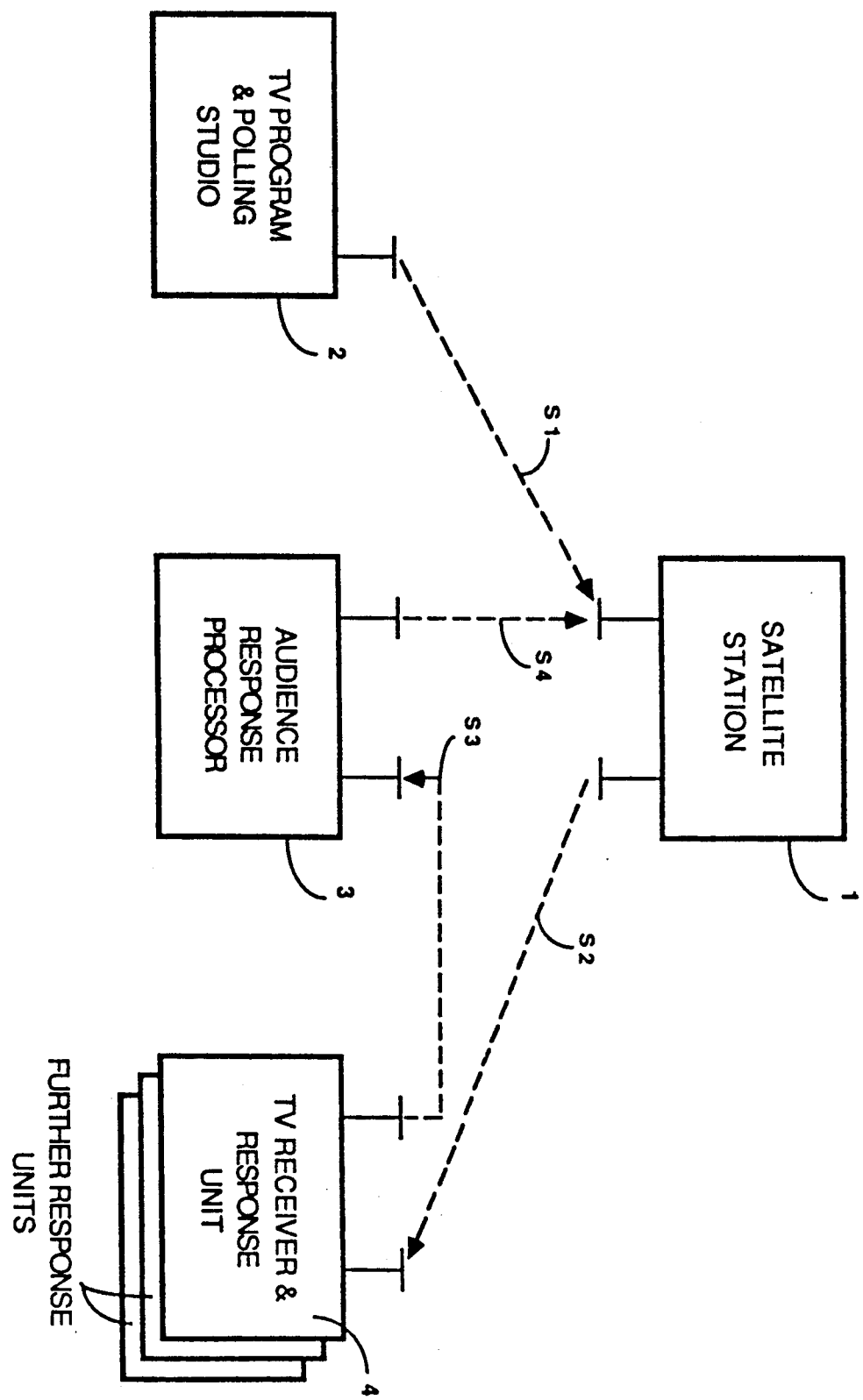
FIG. 1 shows a generalized block diagram of the satellite station controlled audience polling system and method afforded by this invention.

The general organization of a preferred embodiment of the satellite controlled audience polling system afforded by this invention is shown in FIG. 1. The satellite station 1 receives from the TV program and polling studio 2 on transmission link S1 in the conventional way TV picture and program signals for retransmission to TV receiver response unit sites 4 on transmission channel S2. The audience response unit at sites 4 transmit r-f beeps in real time on-line along transmission channel S3 in the manner set forth in the aforementioned U.S. Pat. No. 4,591,906 for ground station localized regional audience response analysis and processing of both answers to poll questions and for selection and billing of program material or purchases from marketing channels, etc. Typically these ground stations 3 can be located within each TV station listening area for use both in local station analysis as set forth in the patent and for further use in an on-line audience response satellite feedback system afforded by this invention.

Semi-processed or fully analyzed audience response data may be accumulated at the ground station audience response processor 3 for transmission along transmission link S4 to the satellite station 1, where it is further processed together with responses from various local ground stations 3, which might be located nation-wide for example. Each ground station may be identified by a distinctive frequency of transmission, or by employing a synchronized timing identification system corresponding to that set forth in U.S. Pat. No. 4,591,906, wherein the transmission time from the ground stations to the satellite station and back to the TV receiver stations in the respective audiences are carefully timed to assure presentation of polling results in a synchronously timed picture position matching the questions asked and the answers received on the picture for audience information. The audience response data received at the satellite station 1 may be further analyzed and processed as the case may be for selecting desired types of information to be shared with the audience being polled. Such audience response analysis systems are well known and in general comprise programmable computers that serve to sort and store the on-line audience response signals either in raw format or statistically sorted and analyzed as desired.

The reference character notation used in the various views is chosen to facilitate cross reference between the various views. For example, the elements in FIG. 2 with the prefix reference character 2 relate to the TV program and polling studio 2 of the FIG. 1 system.

Figure 2:
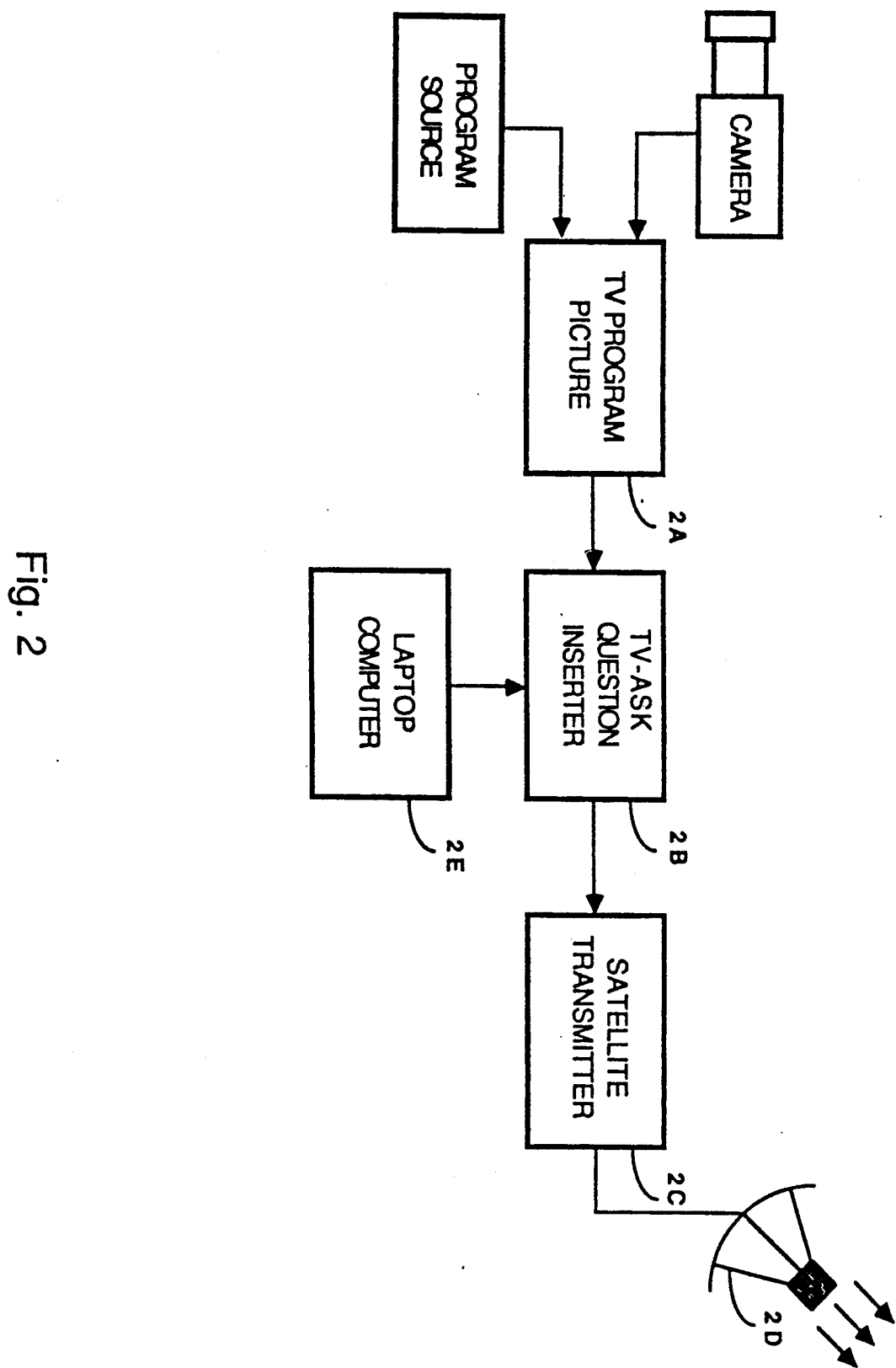
FIG. 2 shows in block diagram form a preferred embodiment of a TV transmission system for incorporating questions into a TV picture for polling an audience in accordance with this invention.

The polling feature of the TV studio 2 is illustrated in FIG. 2 where the program picture video at 2A from a camera or other program source is processed at the TV-Ask question inserter, preferably of the type set forth in U.S. Pat. No. 4,591,906, in order to provide the polling questions visibly on the picture being transmitted by way of satellite transmitter 2C and antenna 2D to the satellite station. The laptop computer 2E, for example, or other types of studio equipment, may develop a graphic video format compatibly arranged for insertion of a suitable polling question, such as yes and no vote boxes, in the picture video channel carrying the program picture video 2A. By positioning the questions on the TV picture such instruments may be used to facilitate audience response as set forth in the co-pending application Ser. No. 07/368,951 filed June 13, 1989 for Wireless Remote Control of Cursor Superimposed on TV Picture by Fernando Morales, et al. Therein a cursor is manually positioned at a screen position identified by a question on the screen, for example by locating the cursor at either the yes or no answer position displayed on the screen in real time. In accordance with this invention answers from the polled audience may be displayed on the picture alongside the questions or choices to show the current audience response.

Figure 3:
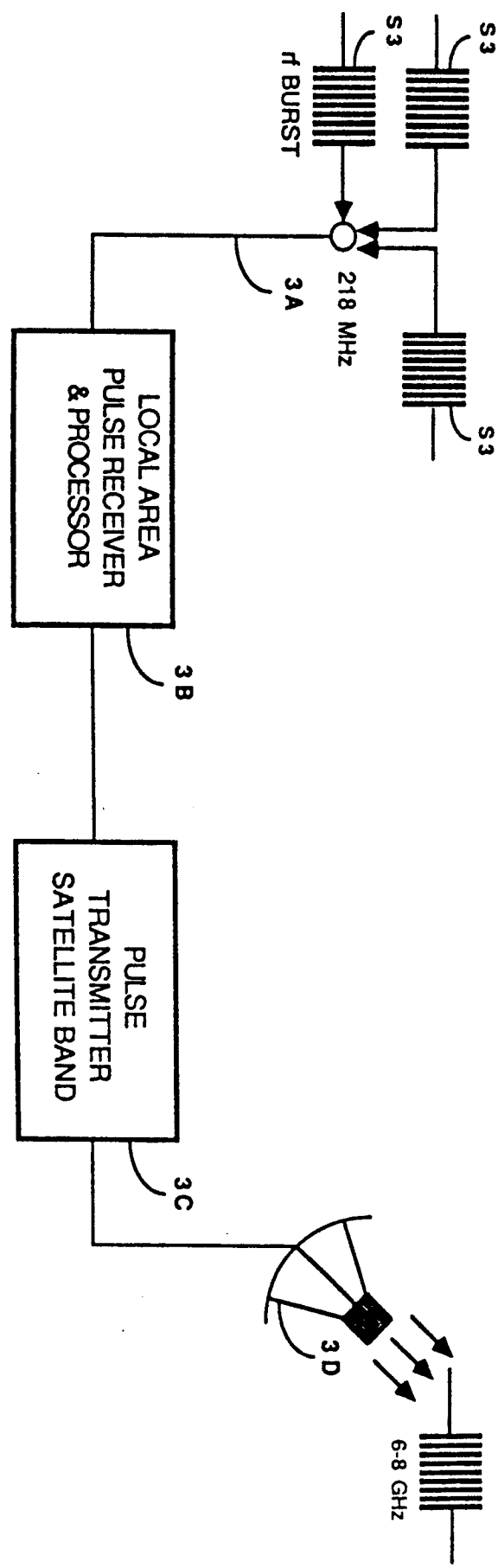
FIG. 3 shows in block diagram form a local area audience analysis station embodiment afforded by this invention.

As seen in FIG. 3, various r-f bursts or beeps from answering TV receiver site response units at a frequency such as 218 MHz are assembled at the antenna 3A for processing in the local area ground station processor 3B. This processor serves for example the listening area for a local TV transmitter and is preferably of the type described in U.S. Pat. No. 4,591,906. The processed results are then transmitted at 3C to the satellite station by way of antenna 3D at a frequency such as 6 to 8 GHz. Alternatively this local area pulse processor 3B could be a response unit for single TV response unit sites as shown in FIG. 1.

Figure 4:
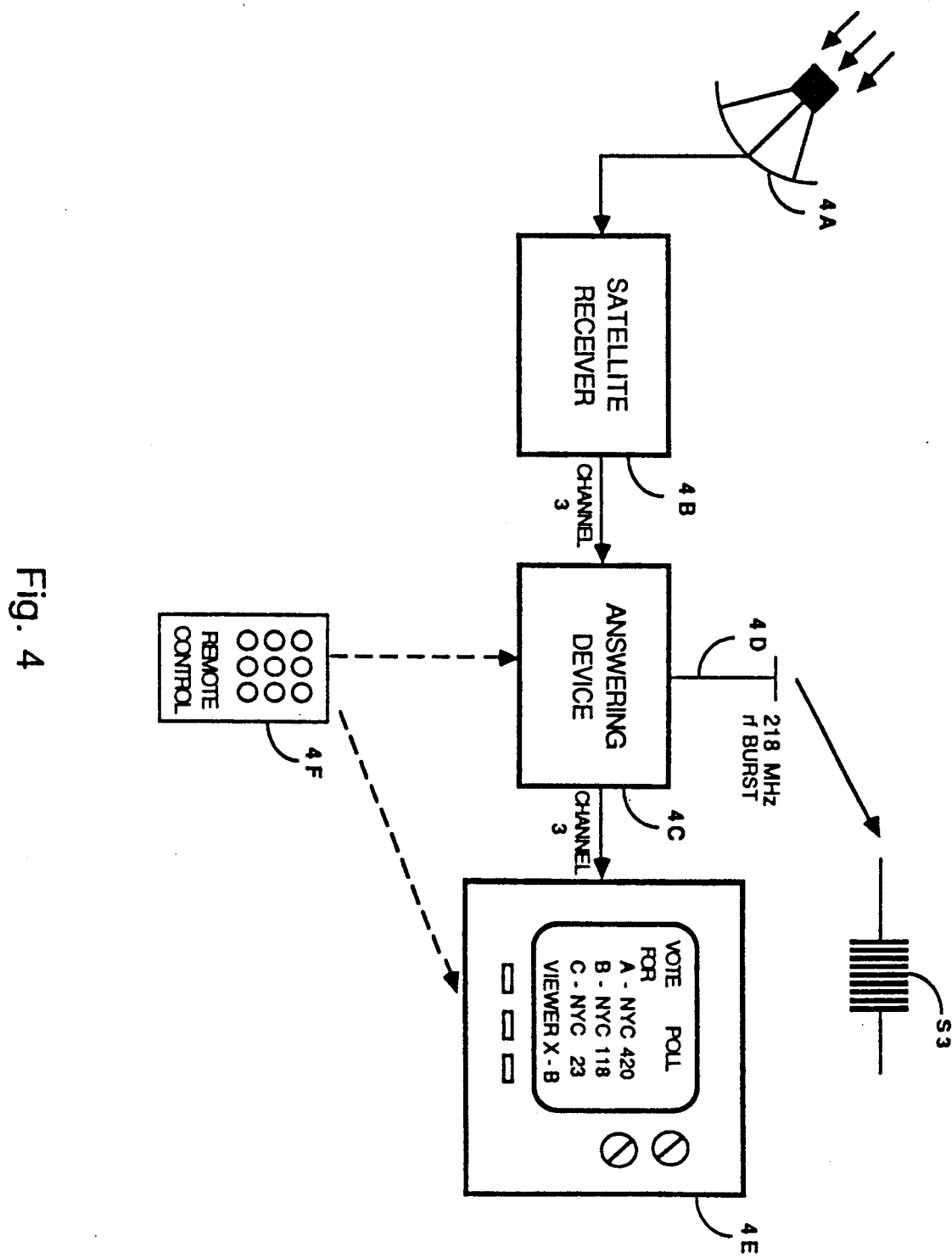
FIG. 4 shows in block diagram a response unit embodiment located at the TV receiver stations of the polled audience in accordance with this invention.

The TV receiver response unit stations are required in accordance with this invention to communicate with the satellite station and thus signals are received at antenna 4A in FIG. 4 for processing at a satellite receiver 4B for frequency conversion, preferably to provide signals for channel 3 to be compatible for use in cable systems. The remote control 4F is then used for responding to questions posed on the picture screen in the TV set 4E by way of the answering device, preferably such as shown in U.S. Pat. No. 4,591,906. Thus, the 218 MHz timed r-f beep S3 is transmitted by way of antenna 4D to the local pulse receiver and processor in FIG. 3 or alternatively directly to the satellite station for processing there.

Figure 5:
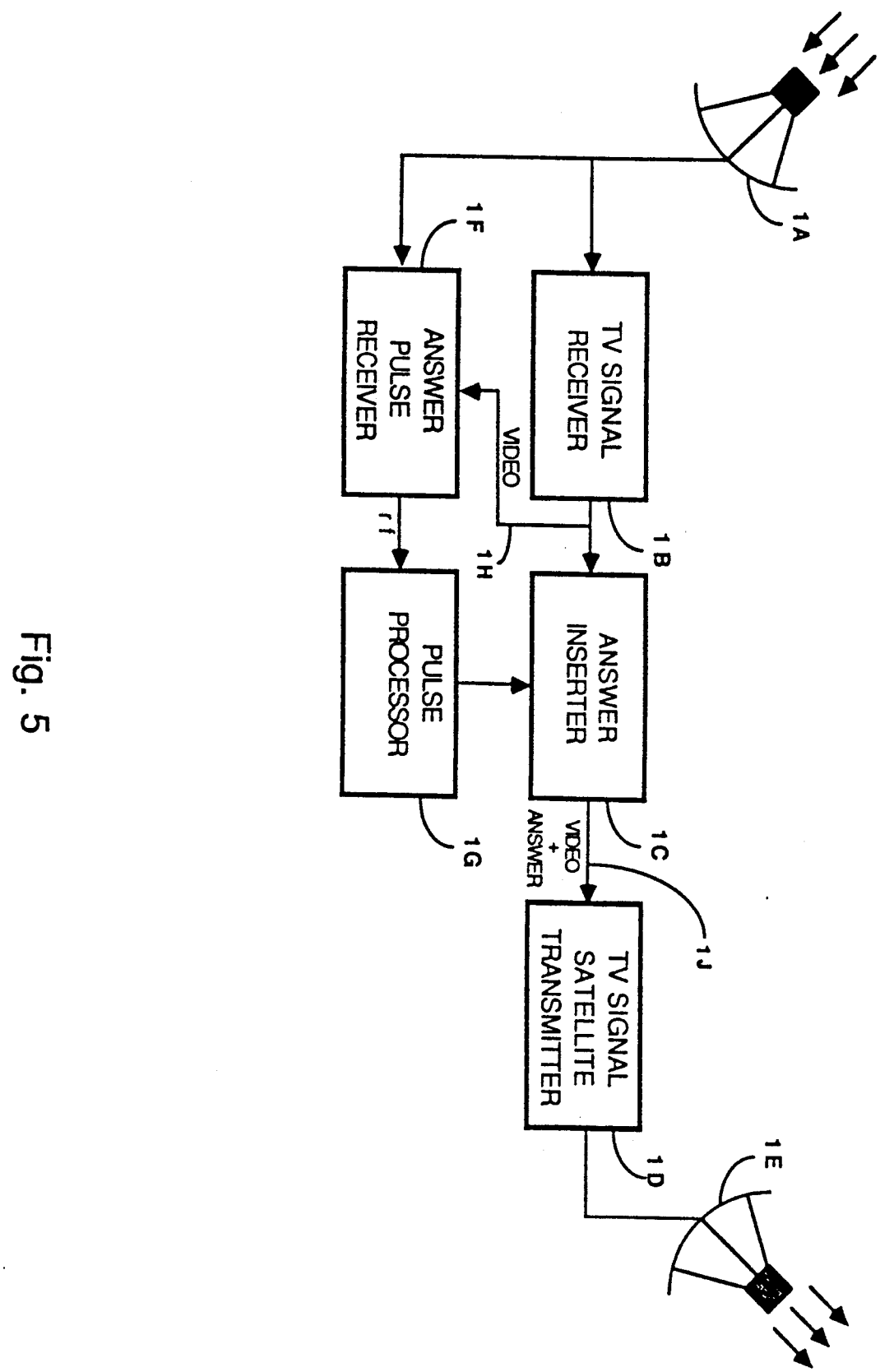
FIG. 5 shows in block diagram form a preferred embodiment of the satellite station system of this invention for processing audience response signals and incorporating the response into the video picture, preferably alongside the questions being asked.

As shown in FIG. 5, both the TV program signal from FIG. 2 and the response data from FIG. 3 or 4 are received at input antenna 1A. The picture program is processed at receiver channel 1B and the video is separated at 1H for purpose of time synchronization of the answer pulses processed in channel 1F and 1G, preferably as set forth in U.S. Pat. No. 4,591,906. The resulting answers to questions carried on the TV program signal video pictures is then timed appropriately for display on the picture alongside the questions in a desirable format (FIG. 4) by answer inserter block 1C so that the polled audience may observe the current reaction to the polling. Then the TV program with the picture representation of both video questions and answers is carried at lead 1J to the conventional satellite transmitter 1D and antenna 1E. In the answer processing blocks 1F, 1G and 1C the higher conventional satellite frequency bands are converted down to the conventional TV transmission band range. The transmitter 1D then reconverts the signals to the conventional higher satellite frequency bands.

Figure 6:
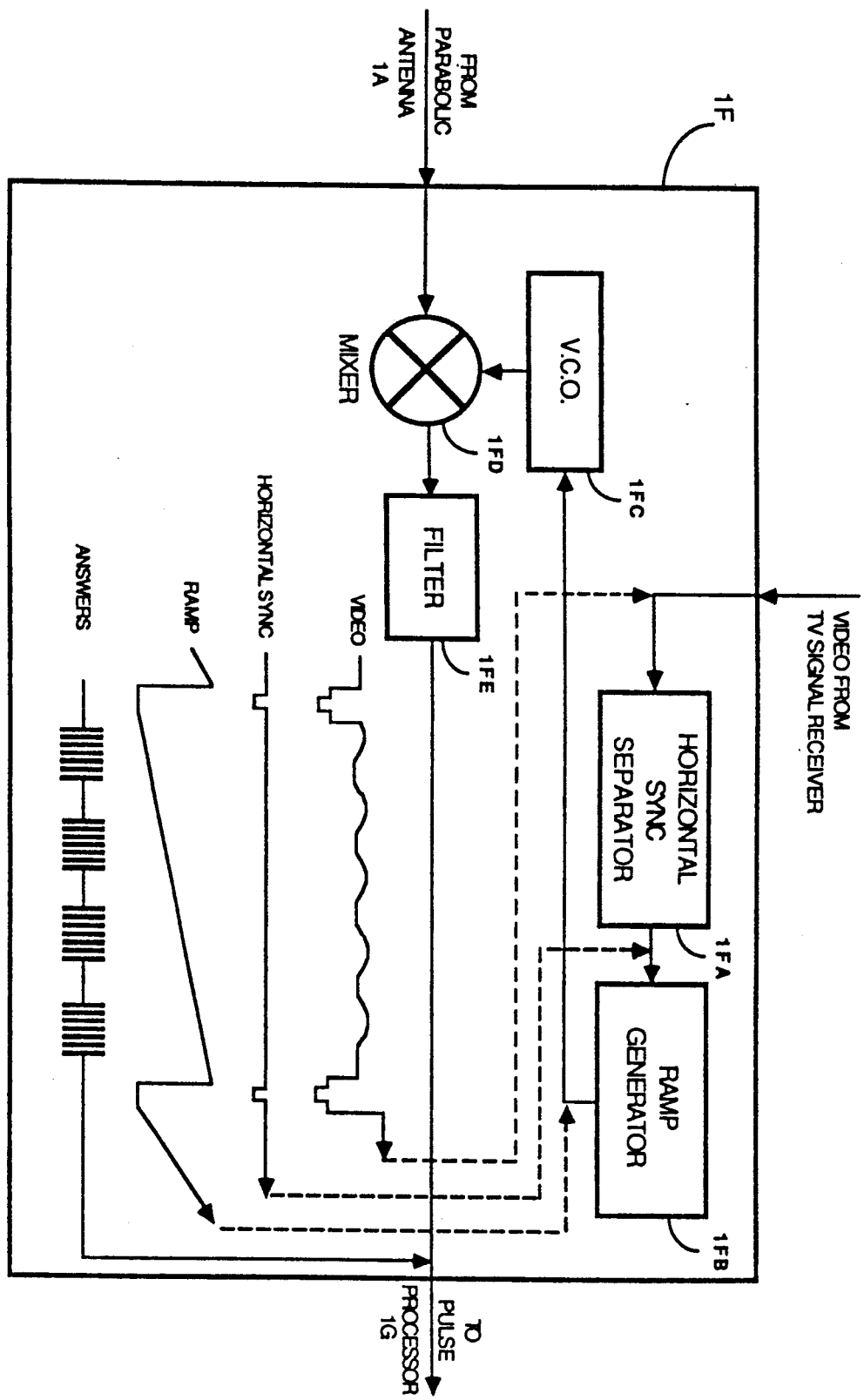
FIG. 6 is a block diagram with accompanying waveforms for a preferred embodiment of audience response receiving and processing equipment at the satellite station as provided in accordance with this invention.

One embodiment of the answer pulse receiver 1F is shown in more detail in FIG. 6, where the corresponding input and output lines correspond to similar lines in the showing of FIG. 5. The answer beeps as represented diagrammatically alongside the ramp derived for the horizontal sync period from the picture video are timed in the system of U.S. Pat. No. 4,591,906 to fall at different precisely timed places in the video picture. Thus, the pulses may be verified and counted in the pulse r-f detector for insertion into the picture, for example. They may also be isolated for different localities, such as by identifying the count from different local ground stations in the same way as answers are obtained at the local TV set site in U.S. Pat. No. 4,591,906, or by using different frequency beeps from different localities, etc. Thus, a wide variety of information may be obtained from a polled audience and displayed currently for viewing of the audience being polled by appropriate programming at satellite and ground pulse processing stations. The filter 1FE selects only one frequency at a time for isolation of different TV station responses, for example. Thus the horizontal sync pulses are derived at sync separator 1FA to develop the ramp at 1FB. This ramp variably controls the frequency of the voltage controlled oscillator 1FC and permits mixing at mixer 1FD of the received answer pulses so that their timing with the video frames can be established for verification, counting and such other selection or processing as may be desired. For example the filter 1FE could sequentially process beeps of different frequencies from different participating TV stations to identify and display on the picture a series of local results, or the total pulses may simply be counted and the count displayed for an overall vote result.

Therefore it is recognized that this invention provide a novel audience polling system using satellite communications, and furthermore provides an automated on-line system for displaying the results of polling currently to the polled audience. Those features of novelty believed descriptive of the spirit and nature of the invention are therefore defined with particularity in the appended claims.

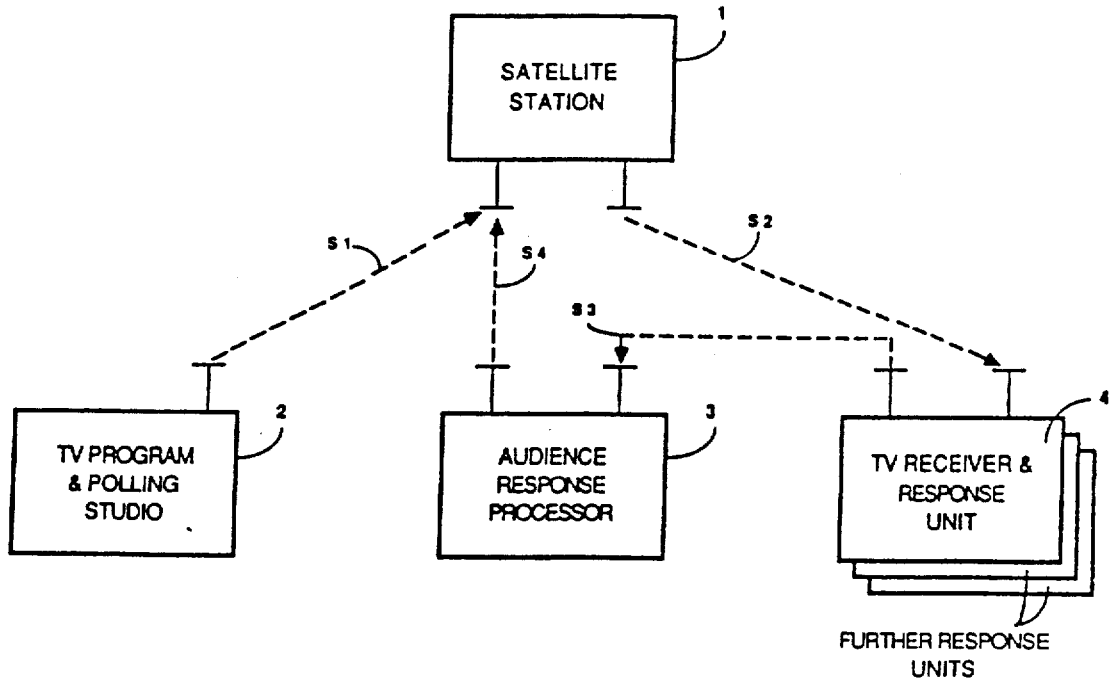

I claim:

1. In a satellite television system for relaying TV programs to a plurality of TV receiving stations from a satellite, the improvement comprising, ground station audience polling means for producing questions in the TV programs for an audience being polled, response means at the TV receiving stations for producing answers to the questions, satellite transceiver means for relaying questions and answers between the polling means and response means, means for processing answers from the response means of at least a subset of said plurality of TV receiving stations to produce a consolidated result from an audience poll, and ground station studio means for incorporating the produced questions and consolidated result together as a video signal relayed by said satellite transceiver means, for transmission from the satellite back to the audience.

2. The improvement of claim 1 further comprising, means for producing said consolidated result from the audience poll in real time and means at said ground station studio for transmitting the consolidated results substantially instantaneously back to the polled audience.

3. The improvement of claim 1 wherein said response means provides answers from at least a subset of said plurality of TV stations, each subset being in a local vicinity, by transmission of a timed r-f burst of a designated frequency and wherein said means for processing answers comprises audience response processing means at a ground station for processing the audience answers from said subset and transmitting said consolidated result back to said satellite for relaying to said audience as a part of the video signal relayed by said satellite.

4. The improvement of claim 1 further comprising means in the satellite for processing separately audience responses from different local audiences.

5. The improvement of claim 4 further comprising means in the satellite for processing answers as r-f beep responses from different local audiences identified by respectively different frequencies, wherein the beep responses are synchronously timed to compensate for r-f beep travel time to the satellite and back to the respective local audiences.

6. A system for polling TV audiences comprising in combination, means for presenting questions for polling an audience on a TV picture being broadcast from a satellite station, local means at TV reception sites for responding on-line to the questions and communicating the responses to the satellite station, and means in the satellite station for processing on-line responses and inserting response results into the current TV pictures being broadcast.

7. The method of polling a TV audience and reporting polling results comprising the steps of: polling a TV audience from a satellite station by presenting questions in the TV program materials, responding to the questions at TV reception sites while the questions are being broadcast, recovering the responses and incorporating results from the responses in the TV program materials during the period of broadcast of the questions.

8. The method of claim 7, further comprising the step of:
presenting both questions and answers on a TV pictures being broadcast currently during a polling period.

9. The method of polling a TV audience and reporting polling results comprising the steps of: polling a TV audience from a satellite station by presenting questions in the TV program materials, responding to the questions with answers from different TV reception sites while the questions are being broadcast, recovering the responses and incorporating results from the responses in the TV program materials during the period of broadcast of the questions,
processing responses from said different TV reception sites at a plurality of local ground stations by means of r-f signals respectively of different frequencies, and
processing at the satellite station a multiplicity of responses from different local ground stations by means of timed r-f beeps of the same frequency transmitted to the satellite from the different ground stations.

10. The method of claim 9 wherein the program materials are presented as TV pictures composed from an array of picture segments identified, sequenced and timed as horizontal lines, further comprising the step of:
synchronously timing the r-f beeps with video signals in the TV program materials being broadcast from the satellite station to distribute them at different timed positions within specified ones of said segments.

11. The method of polling a TV audience and reporting polling results comprising the steps of: polling a TV audience from a satellite station by presenting questions in the TV program materials, responding to the questions at TV reception sites while the questions are being broadcast, recovering the responses and incorporating results from the responses in the TV program materials during the period of broadcast of the questions, and
processing responses from different TV reception locations by means of r-f signals of different frequencies.

12. The method of polling a TV audience and reporting polling results comprising the steps of: polling a TV audience from a satellite station by presenting questions in the TV program materials, responding to the questions at TV reception sites while the questions are being broadcast, recovering the responses and incorporating results from the responses in the TV program materials during the period of broadcast of the questions, and
producing responses with a plurality of short, timed r-f beeps falling within picture frames of the TV program materials being broadcast from the satellite, and timing the responses at the satellite station to compensate for travel time of the broadcast signal to the TV reception locations and response signals back to the satellite.

13. The method of polling a TV audience and reporting polling results comprising the steps of: polling a TV audience from a satellite station by presenting questions in the TV program materials, responding to the questions at TV reception sites while the questions are being broadcast, recovering the responses and incorporating results from the responses in the TV program materials during the period of broadcast of the questions, and
broadcasting said TV program materials from the satellite at a frequency range convertible into a cable distribution channel frequency for use in TV receivers at said TV reception sites.

14. In a satellite television system for relaying TV programs to a plurality of TV receiving stations at different local reception sites over a widely dispersed geographic area from a satellite, the improvement comprising, audience polling means at a ground station studio for producing questions in the TV programs for an audience being polled, response means at the TV receiving stations for answering the questions, means for processing answers from the response means of at least a subset of said plurality of TV receiving stations located at one of the different local reception sites to produce a consolidated result from answers to an audience poll, and means for incorporating the processed answers in the relayed programs for transmission from the satellite back to the audience.

* * * * *

UNITED STATES PATENT AND TRADEMARK OFFICE
CERTIFICATE OF CORRECTION

PATENT NO. : 5,036,389

DATED : July 30, 1991

INVENTOR(S) : Fernando Morales

It is certified that error appears in the above-identified patent and that said Letters Patent is hereby corrected as shown below:

On the title page:
　　The assignee is corrected to indicate that the sole assignee is Magus, Ltd., at the address: Grand Cayman Island, Cayman Corporate Services, Georgetown, British West Indies.

The title page should be deleted to appear as per attached title page.

Signed and Sealed this

Twenty-seventh Day of October, 1992

*Attest:*

DOUGLAS B. COMER

*Attesting Officer*　　　*Acting Commissioner of Patents and Trademarks*

United States Patent [19]

Morales

[11] Patent Number: 5,036,389
[45] Date of Patent: Jul. 30, 1991

[54] SATELLITE CONTROLLED AUDIENCE POLLING SYSTEM

[75] Inventor: Fernando Morales, Monterrey, Mexico

[73] Assignees: Magus, Ltd., Grand Cayman Island; Cayman Corporate Services, Georgetown, both of Cayman Islands

[21] Appl. No.: 379,921

[22] Filed: Jul. 14, 1989

[51] Int. Cl.⁵ .......................... H04N 7/10; H04B 17/00
[52] U.S. Cl. .......................................... 358/84; 455/2; 455/5
[58] Field of Search .................................. 455/2-3, 455/4-6; 358/84, 86; 340/825.08

[56] References Cited

U.S. PATENT DOCUMENTS

| | | | |
|---|---|---|---|
| 4,107,735 | 8/1978 | Frohbach | 340/721 |
| 4,151,370 | 4/1979 | Foot | 455/2 |
| 4,377,870 | 3/1983 | Anderson et al. | 455/2 |
| 4,591,906 | 5/1986 | Morales-Garza et al. | 358/84 |
| 4,630,108 | 12/1986 | Gomersall | 358/84 |
| 4,684,980 | 8/1987 | Rast et al. | 358/86 |
| 4,689,619 | 8/1987 | O'Brien, Jr. | 358/84 |

Primary Examiner—Reinhard J. Eisenzopf
Assistant Examiner—Andrew Faile
Attorney, Agent, or Firm—Laurence R. Brown

[57] ABSTRACT

A satellite controlled TV audience response system provides means for current processing of answers to audience polls so that answers may be presented in TV pictures alongside the questions substantially instantaneously. This system has the capacity to process both local audience responses such as those in the vicinity of a particular TV station, and audiences over a large geographic area, so that responses can be analyzed to take into account regional differences in response or differences in the listeners to different TV station audiences. The system is fully capable of interaction with local cable networks. Responses can be analyzed at local ground stations for billing purposes, etc., and can be analyzed at the satellite station for retransmission of various audience responses to the polled audience. This invention makes feasible a fully automated instantaneous nationwide TV polling and response feedback system.

14 Claims, 6 Drawing Sheets